US012559141B2

(12) United States Patent
Kim et al.

(10) Patent No.: US 12,559,141 B2
(45) Date of Patent: Feb. 24, 2026

(54) LOGISTICS SYSTEM COMPRISING A TRUCK AND A TRAILER AND RELATED METHOD

(71) Applicants: Hyundai Motor Company, Seoul (KR); Kia Corporation, Seoul (KR)

(72) Inventors: Daehyun Kim, Seoul (KR); Sungsu Park, Iksan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 237 days.

(21) Appl. No.: 18/329,688

(22) Filed: Jun. 6, 2023

(65) Prior Publication Data

US 2023/0415783 A1 Dec. 28, 2023

(30) Foreign Application Priority Data

Jun. 22, 2022 (KR) ......................... 10-2022-0076213

(51) Int. Cl.
*B60W 60/00* (2020.01)
*G06Q 10/08* (2023.01)

(52) U.S. Cl.
CPC ......... *B60W 60/0025* (2020.02); *G06Q 10/08* (2013.01); *B60W 2300/12* (2013.01); *B60W 2300/14* (2013.01)

(58) Field of Classification Search
CPC ......... B60W 60/0025; B60W 2300/12; B60W 2300/14; G06Q 10/08
See application file for complete search history.

(56) References Cited

U.S. PATENT DOCUMENTS

2017/0177949 A1* 6/2017 Hu ........................ B60W 10/20
2018/0097884 A1* 4/2018 Terwilliger ............ H04L 67/52

* cited by examiner

*Primary Examiner* — Ramsey Refai
(74) *Attorney, Agent, or Firm* — Slater Matsil, LLP

(57) ABSTRACT

An embodiment autonomous driving logistics system includes a trailer on which cargo is loadable, a truck connected to the trailer, and a server configured to communicate with the trailer and the truck, to control the trailer and the truck to perform a cross-validation between truck information transmitted to the trailer and trailer information transmitted to the truck to determine whether to start transportation, and monitor a transportation state based on truck state information transmitted from the truck and trailer state information transmitted from the trailer during driving of the truck.

20 Claims, 7 Drawing Sheets

FIG. 3

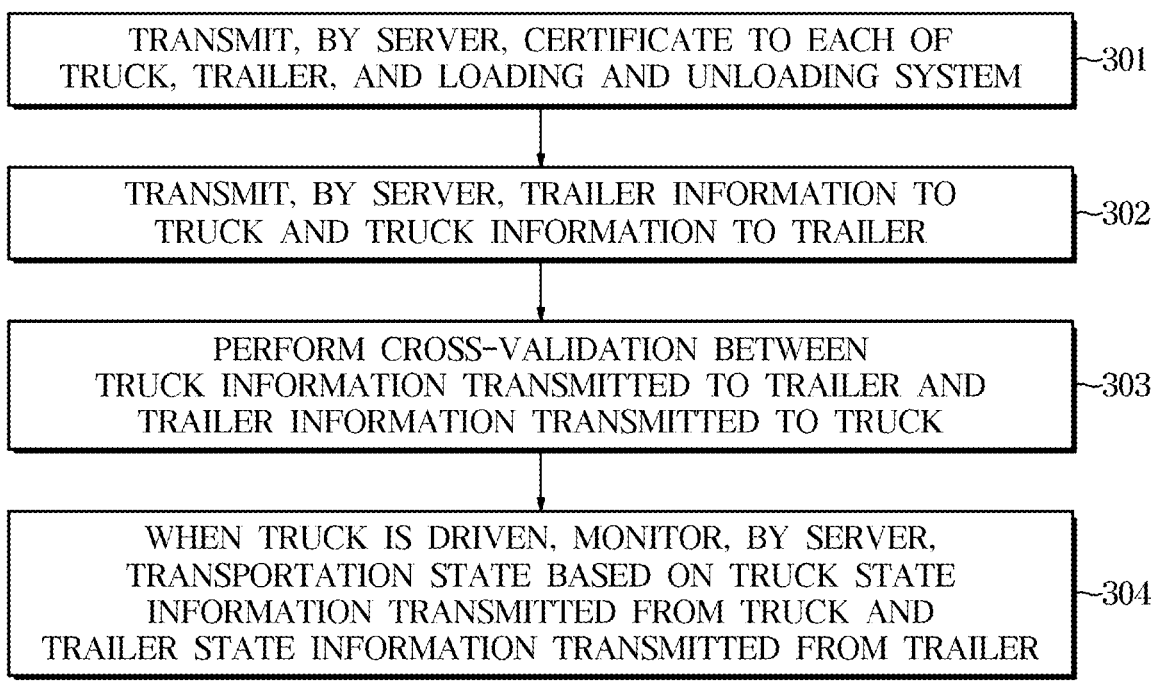

TRANSMIT, BY SERVER, CERTIFICATE TO EACH OF TRUCK, TRAILER, AND LOADING AND UNLOADING SYSTEM ~301

TRANSMIT, BY SERVER, TRAILER INFORMATION TO TRUCK AND TRUCK INFORMATION TO TRAILER ~302

PERFORM CROSS-VALIDATION BETWEEN TRUCK INFORMATION TRANSMITTED TO TRAILER AND TRAILER INFORMATION TRANSMITTED TO TRUCK ~303

WHEN TRUCK IS DRIVEN, MONITOR, BY SERVER, TRANSPORTATION STATE BASED ON TRUCK STATE INFORMATION TRANSMITTED FROM TRUCK AND TRAILER STATE INFORMATION TRANSMITTED FROM TRAILER ~304

500

| TRAILER ID | CARGO ID | CARGO WEIGHT | ORIGIN ID | DESTINATION ID |
|---|---|---|---|---|
| 345219 | 23532 | 100kg | 2341 | 2314 |

FIG. 6

| TRUCK ID | CAPACITY | DRIVING DISTANCE | FAILURE | TIRE STATE | BATTERY | WAITING STATE | CURRENT LOCATION |
|---|---|---|---|---|---|---|---|
| 1234 | 2000kg | 680km | NO | NORMAL | FULL | WAITING | A CENTER |
| 4567 | 1000kg | 580km | NO | NORMAL | 80% | DRIVING | YANGHWA BRIDGE |
| 7890 | 500kg | 480km | NO | NORMAL | 20% | CHARGING | A CENTER |

| TRAILER ID | CARGO ID | CARGO WEIGHT | ORIGIN ID | DESTINATION ID | ASSIGNED TRUCK ID | TRUCK CONNECTION STATE | CURRENT LOCATION |
|---|---|---|---|---|---|---|---|
| 345219 | 23532 | 100kg | 2341 | 2314 | 1234 | NOT CONNECTED | A CENTER |
| 325234 | 8232 | 45kg | 2871 | 1214 | 23412 | CONNECTED | A CENTER |

700

710

500

LOGISTICS SYSTEM COMPRISING A TRUCK AND A TRAILER AND RELATED METHOD

CROSS-REFERENCE TO RELATED APPLICATIONS

This application claims the benefit of Korean Patent Application No. 10-2022-0076213, filed on Jun. 22, 2022, which application is hereby incorporated herein by reference.

TECHNICAL FIELD

The disclosure relates to an autonomous driving logistics system and an autonomous driving logistics method.

BACKGROUND

An autonomous truck may be automatically connected to a trailer in a logistics warehouse and may transport the trailer to a destination. However, in the prior art, a procedure of determining whether a truck is a safe truck or whether a trailer is normal is not performed. For example, when a truck is hacked, cargo loaded on a trailer may be transported to a place different from a destination and taken over. When the trailer is hacked, the truck may be combined with a trailer loaded with other cargo. In order to prevent such transportation accidents, it is necessary to verify the integrity of the truck and the trailer. Also, it is necessary to continuously monitor states of the truck and the trailer even during transportation.

SUMMARY

The disclosure relates to an autonomous driving logistics system and an autonomous driving logistics method. Particular embodiments relate to an autonomous driving logistics system and an autonomous driving logistics method in which cargo may be loaded on a trailer and a truck may transport the trailer without human intervention.

Embodiments of the disclosure provide an autonomous driving logistics system and an autonomous driving logistics method in which the integrity of a truck and a trailer may be verified in a process of transporting cargo without human intervention.

Also, embodiments of the disclosure provide an autonomous driving logistics system and an autonomous driving logistics method in which states of a truck and a trailer may be continuously monitored even during transportation.

An autonomous driving logistics system according to an embodiment includes a trailer on which cargo is loaded, a truck coupled with the trailer, and a server configured to communicate with the trailer and the truck, wherein the server is configured to control the trailer and the truck to perform cross-validation between truck information transmitted to the trailer and trailer information transmitted to the truck to determine whether to start transportation and monitor a transportation state based on truck state information transmitted from the truck and trailer state information transmitted from the trailer when the truck is driven.

The autonomous driving logistics system may further include a loading and unloading system configured to generate first trailer information based on the loading of the cargo on the trailer and transmit the first trailer information to the server, wherein the server is configured to select the truck to be connected to the trailer from a truck list, store first truck information about the selected truck, transmit second truck information, which is a duplicate of the first truck information, to the trailer, and transmit second trailer information, which is a duplicate of the first trailer information, to the truck.

The trailer may be configured to obtain the second trailer information stored in the truck when coupled with the truck and verify validity of the second trailer information by comparing the second trailer information with the first trailer information stored in the server.

The truck may be configured to obtain the second truck information stored in the trailer when coupled with the trailer and verify validity of the second truck information by comparing the second truck information with the first truck information stored in the server.

The server may be configured to monitor whether the truck is hacked by comparing the truck state information with the first truck information stored in the server and monitor whether the trailer is hacked by comparing the trailer state information with the first trailer information stored in the server.

The server may be configured to control the trailer and the truck to further verify whether a first certificate transmitted to the truck and a second certificate transmitted to the trailer are identical to each other.

Each of the trailer and the truck may be configured to transmit a connection completion signal to the server based on success of the cross-validation.

The server may be configured to transmit a driving test command to the truck in response to receiving the connection completion signal, and the truck may be configured to start transportation to a destination after completing a driving test in response to the driving test command.

The truck and the trailer may be configured to respectively transmit the truck state information and the trailer state information to the server at pre-determined intervals.

The trailer information may include a trailer identification number, a cargo identification number, cargo weight information, an origin identification number, and a destination identification number, and the trailer state information may include the trailer information, a truck identification number, truck connection state information, and current location information.

The truck information may include a truck identification number, truck capacity information, failure information, battery information, and waiting state information, and the truck state information may include the truck information and current location information.

An autonomous driving logistics method according to an embodiment includes transmitting truck information from a server to a trailer for coupling of a truck and the trailer, transmitting trailer information from the server to the truck for the coupling of the truck and the trailer, controlling the trailer and the truck to perform cross-validation between the truck information transmitted to the trailer and the trailer information transmitted to the truck to determine whether to start transportation, and monitoring a transportation state based on truck state information transmitted from the truck to the server and trailer state information transmitted from the trailer to the server, when the truck is driven.

The transmitting of the truck information may include selecting, by the server, the truck to be connected to the trailer from a truck list, storing, by the server, first truck information about the selected truck, and transmitting second truck information, which is identical to the first truck information, to the trailer.

The transmitting of the trailer information may include, when cargo is loaded on the trailer by a loading and unloading system, transmitting first trailer information from the loading and unloading system to the server, and transmitting second trailer information, which is identical to the first trailer information, to the truck.

The controlling of the trailer and the truck may include controlling the trailer to obtain the second trailer information stored in the truck when the truck and the trailer are coupled with each other and to verify validity of the second trailer information by comparing the second trailer information with the first trailer information stored in the server.

The controlling of the trailer and the truck may include controlling the truck to obtain the second truck information stored in the trailer when the truck and the trailer are coupled with each other and to verify validity of the second truck information by comparing the second truck information with the first truck information stored in the server.

The monitoring of the transportation state may include monitoring whether the truck is hacked by comparing the truck state information with the first truck information stored in the server and monitoring whether the trailer is hacked by comparing the trailer state information with the first trailer information stored in the server.

The controlling of the trailer and the truck may include controlling the trailer and the truck to further verify whether a first certificate transmitted to the truck and a second certificate transmitted to the trailer are identical to each other.

The controlling of the trailer and the truck may include transmitting a connection completion signal from each of the trailer and the truck to the server based on success of the cross-validation.

The controlling of the truck may include transmitting a driving test command from the server to the truck and controlling the truck to start transportation to a destination after completing a driving test in response to the driving test command.

The truck state information and the trailer state information may be transmitted to the server at pre-determined intervals.

BRIEF DESCRIPTION OF THE DRAWINGS

FIG. 3 is a flowchart for describing an autonomous driving logistics method, according to an embodiment.

FIG. 6 illustrates truck information and truck state information.

FIG. 7 illustrates trailer state information.

DETAILED DESCRIPTION OF ILLUSTRATIVE EMBODIMENTS

Figure 1:
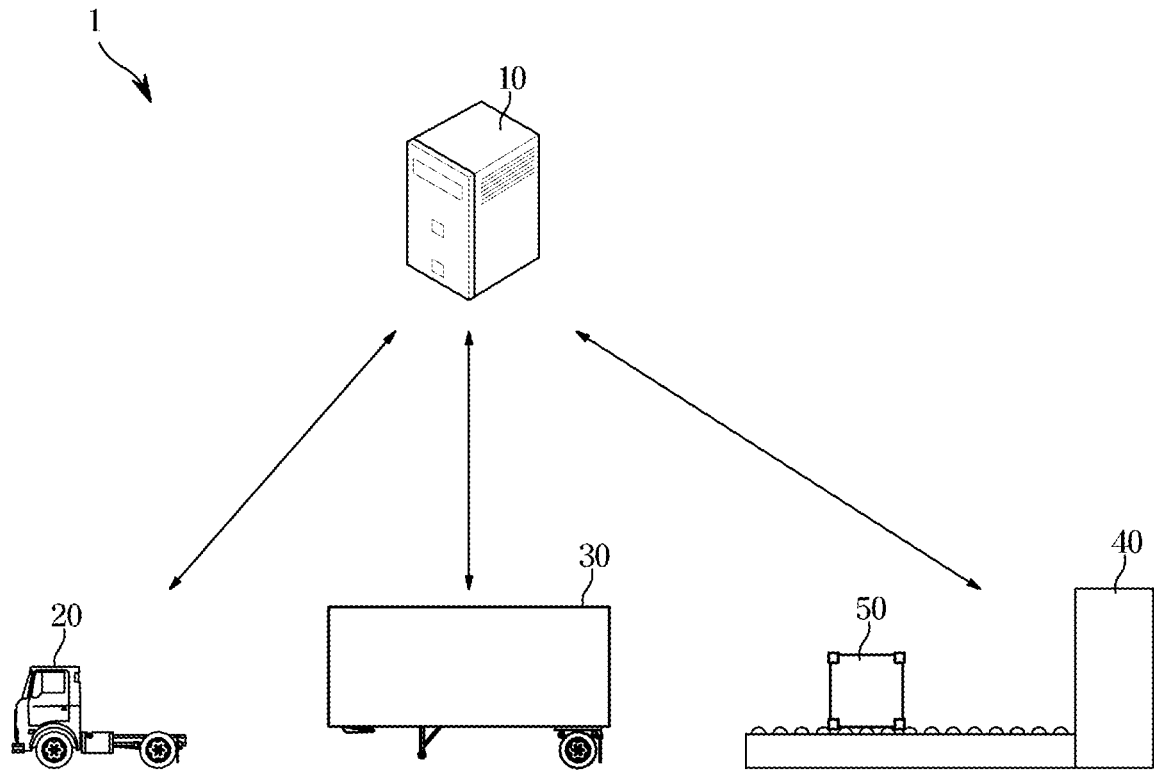
FIG. 1 is a view illustrating an autonomous driving logistics system, according to an embodiment.

The same reference numerals denote the same elements throughout the specification. All elements of embodiments are not described in the specification, and descriptions of matters well known in the art to which the disclosure pertains or repeated descriptions between the embodiments will not be given.

Also, in embodiments of the present specification, it will be understood that when a portion is "connected" to another portion, the portion may be directly connected to the other portion, or may be indirectly connected to the other portion, and the indirect connection includes connection through a wireless communication network. In addition, when a part "includes" a certain element, the part may further include another element instead of excluding the other element, unless otherwise stated. The singular forms "a," "an," and "the" are intended to include the plural forms as well, unless the context clearly indicates otherwise.

Also, terms such as " . . . unit," " . . . er," " . . . block," " . . . member," or " . . . module" may refer to a unit for processing at least one function or operation. For example, the above terms may refer to at least one process performed by at least one hardware such as a field-programmable gate array (FPGA)/application-specific integrated circuit (ASIC), or at least one software or a processor stored in a memory.

Reference numerals used in operations are used to identify the operations, without describing the order of the operations, and the operations may be performed in an order different from the stated order unless a specific order is definitely specified in the context.

Hereinafter, embodiments of the disclosure will now be described more fully with reference to the accompanying drawings.

FIG. 1 is a view illustrating an autonomous driving logistics system, according to an embodiment.

Referring to FIG. 1, an autonomous driving logistics system 1 according to an embodiment may include a server 10, a truck 20, a trailer 30, and a loading and unloading system 40.

The server 10 may communicate with each of the truck 20, the trailer 30, and the loading and unloading system 40. The truck 20 may communicate with the trailer 30. The trailer 30 may communicate with the loading and unloading system 40. The server 10, the truck 20, the trailer 30, and the loading and unloading system 40 may transmit and receive a signal, a command, and/or data by using wireless communication or wired communication.

The wireless communication may include cellular communication using 5th generation (5G), long term evolution (LTE), LTE Advanced (LTE-A), code-division multiple access (CDMA), wideband CDMA (WCDMA), universal mobile telecommunications system (UMTS), wireless broadband (WiBro), or global system for mobile communications (GSM).

The wireless communication may include wireless fidelity (WiFi), Bluetooth, Bluetooth low energy (BLE), Zigbee, near-field communication (NFC), magnetic secure transmission, radio frequency (RF), or body area network (BAN).

Also, the wireless communication may include a global navigation satellite system (GNSS). The GNSS may be a global positioning system (GPS), a global navigation satellite system (GLONASS), a BeiDou navigation satellite system, or Galileo that is the European global satellite-based navigation system.

The wired communication may include universal serial bus (USB), high-definition multimedia interface (HDMI), recommended standard 232 (RS-232), power line communication, or plain old telephone service (POTS).

Cargo 50 may be loaded on the trailer 30 by an operation of the loading and unloading system 40. The loading and unloading system 40 may include a rail for moving the cargo 50. The truck 20 may be automatically combined with the trailer 30 on which the cargo 50 is loaded and may transport the cargo 50 to a destination. Because all processes from the loading of the cargo 50 to the transportation are performed without human intervention, logistics congestion and logistics waiting may be reduced.

Figure 2:
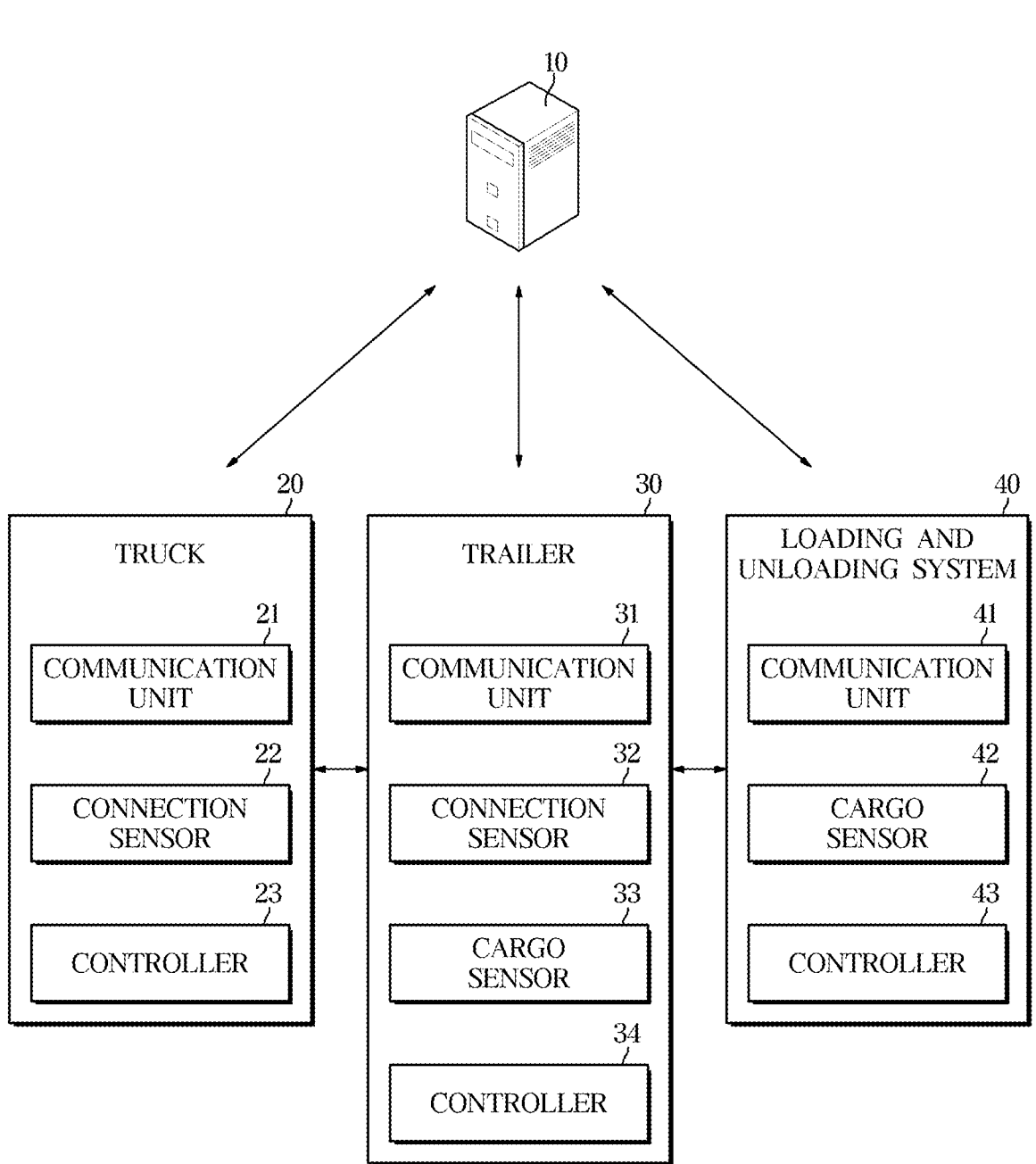
FIG. 2 illustrates a detailed configuration of an autonomous driving logistics system, according to an embodiment.

FIG. 2 illustrates a detailed configuration of an autonomous driving logistics system, according to an embodiment.

Referring to FIG. 2, the server 10 that is a computing device may include a processor and a memory. Also, the server 10 may include a communication device. The communication device may be a device to which any of the above communication technologies is applied. The server 10 may include a program, instructions, and/or an application for executing an autonomous driving logistics method. An application and/or a program for executing an autonomous driving logistics method may also be installed in each of the truck 20, the trailer 30, and the loading and unloading system 40.

The truck 20 may include a communication unit 21, a connection sensor 22, and a controller 23. The controller 23 may be electrically connected to electronic devices of the truck 20 and may control each of the electronic devices. The communication unit 21 may communicate with an external device. As described above, the communication unit 21 may communicate with each of the server 10 and the trailer 30 by using wireless communication and/or wired communication. The communication unit 21 of the truck 20 may be referred to as a 'first communication unit'.

A connection sensor 22 of the truck 20 may detect connection or disconnection between the truck 20 and the trailer 30. The connection sensor 22 may transmit a connection signal corresponding to coupling between the truck 20 and the trailer 30 to the controller 23. The connection sensor 22 may transmit a disconnection signal corresponding to separation of the truck 20 from the trailer 30 to the controller 23. The connection sensor 22 included in the truck 20 may be referred to as a 'first connection sensor'.

The controller 23 of the truck 20 may include a processor and a memory. The memory may store a program, instructions, and/or an application for performing an autonomous driving logistics method. The processor may execute the program, the instructions, and/or the application stored in the memory. A plurality of processors and a plurality of memories may be provided. Also, the controller 23 may include control units such as an electronic control unit (ECU) and a micro control unit (MCU) provided in a vehicle. The controller 23 of the truck 20 may be referred to as a 'first controller'.

The memory may include a non-volatile memory device such as a cache, a read-only memory (ROM), a programmable ROM (PROM), an erasable programmable ROM (EPROM), an electrically erasable programmable ROM (EEPROM), or a flash memory. Also, the memory may include a volatile memory device such as a random-access memory (RAM), and may include a storage medium such as a hard disk drive (HDD) or a compact disk (CD)-ROM.

The truck 20 may include various devices in addition to the above elements. For example, the truck 20 may include devices essential for driving such as a battery, wheels, and a motor.

The trailer 30 may include a communication unit 31, a connection sensor 32, a cargo sensor 33, and a controller 34. The controller 34 may be electrically connected to electronic devices of the trailer 30 and may control each of the electronic devices. The communication unit 31 may communicate with an external device. The communication unit 31 may communicate with the server 10, the truck 20, and the loading and unloading system 40 by using wireless communication and/or wired communication. The communication unit 31 of the trailer 30 may be referred to as a 'second communication unit'.

The connection sensor 32 may detect connection or disconnection between the truck 20 and the trailer 30. The connection sensor 32 may transmit a connection signal corresponding to coupling between the truck 20 and the trailer 30 to the controller 34. The connection sensor 32 may transmit a disconnection signal corresponding to separation of the truck 20 from the trailer 30 to the controller 34. The connection sensor 32 connected to the trailer 30 may be referred to as a 'second connection sensor'.

The cargo sensor 33 may detect the cargo 50 loaded in the trailer 30. When the cargo 50 is loaded in the trailer 30, the cargo sensor 33 may transmit a loading signal corresponding to cargo loading to the controller 34. When the cargo 50 is unloaded from the trailer 30, the cargo sensor 33 may transmit an unloading signal corresponding to cargo unloading to the controller 34. The controller 34 of the trailer 30 may identify loading or unloading of the cargo 50 based on a signal transmitted from the cargo sensor 33. The cargo sensor 33 of the trailer 30 may be referred to as a 'first cargo sensor'.

The controller 34 of the trailer 30 may include a processor and a memory. The memory may store a program, instructions, and/or an application for performing an autonomous driving logistics method. The processor may execute the program, the instructions, and/or the application stored in the memory. A plurality of processors and a plurality of memories may be provided. The controller 34 of the trailer 30 may be referred to as a 'second controller'.

The trailer 30 may include various devices in addition to the above elements. For example, the trailer 30 may include devices essential for driving such as wheels and a motor.

The loading and unloading system 40 may include a communication unit 41, a cargo sensor 42, and a controller 43. The controller 43 may be electrically connected to electronic devices of the loading and unloading system 40 and may control each of the electronic devices. The communication unit 41 may communicate with an external device. The communication unit 41 may communicate with the server 10 and the trailer 30 by using wireless communication and/or wired communication. The communication unit 41 of the loading and unloading system 40 may be referred to as a 'third communication unit'.

The loading and unloading system 40 may load the cargo 50 into the trailer 30 or may unload the cargo 50 from the trailer 30. The cargo sensor 42 may detect the cargo 50 located on a rail and/or a tray of the loading and unloading system 40. The cargo sensor 42 of the loading and unloading system 40 may transmit a signal corresponding to cargo loading or cargo unloading to the controller 43. The controller 43 of the loading and unloading system 40 may identify loading or unloading of the cargo 50 based on a signal transmitted from the cargo sensor 42. The cargo sensor 42 of the loading and unloading system 40 may be referred to as a 'second cargo sensor'.

Elements of the loading and unloading system 40 are not limited thereto. The loading and unloading system 40 may include various devices in addition to the above elements.

The server 10 may transmit a certificate to each of the truck 20, the trailer 30, and the loading and unloading system 40. An authentication procedure using the certificate may be performed, as an initial process for determining whether to start cargo transportation. The server 10 may verify whether the certificate of each of the truck 20, the trailer 30, and the loading and unloading system 40 is identical to a certificate stored in the server 10. When the certificate of any of the truck 20, the trailer 30, and the loading and unloading system 40 is different from the certificate stored in the server 10, the server 10 may stop cargo transportation by stopping an operation of at least one of the truck 20, the trailer 30, or the loading and unloading system 40.

The controller 23 of the truck 20 may identify whether a first certificate that is stored in the truck 20 is identical to a second certificate stored in the trailer 30. The controller 34 of the trailer 30 may identify whether the second certificate that is stored in the trailer 30 is identical to the first certificate stored in the truck 20. When the first certificate of the truck 20 is different from the second certificate of the trailer 30, the controller 23 of the truck 20 may determine to stop the operation.

The server 10 may transmit truck information to the trailer 30 and may transmit trailer information to the truck 20. The truck 20 may move to the trailer 30 identified by the trailer information and may be connected to the trailer 30. Under the control of the server 10, the truck 20, and the trailer 30 may cross-validate the truck information and the trailer information and may start transportation based on validity of the truck information and validity of the trailer information.

While the truck 20 is driven according to the commencement of cargo transportation, the server 10 may obtain truck state information from the truck 20 and may obtain trailer state information from the trailer 30. The server 10 may monitor a transportation state based on the truck state information and the trailer state information. The server 10 may obtain the truck state information and the trailer state information at pre-determined intervals.

In detail, the loading and unloading system 40 may generate first trailer information when the cargo 50 is loaded on the trailer 30 and may transmit the first trailer information to the server 10. The server 10 may select the truck 20 to be connected to the trailer 30 on which the cargo 50 is loaded from a pre-stored truck list. The server 10 may generate and store first truck information about the selected truck 20. The server 10 may transmit second truck information, which is identical to the first truck information, to the trailer 30. The second truck information may be a duplicate of the first truck information. The server 10 may transmit second trailer information, which is identical to the first trailer information, to the selected truck 20. The second trailer information may be a duplicate of the first trailer information.

When the truck 20 and the trailer 30 are connected to each other, the truck 20 may verify validity of the second truck information by comparing the second truck information obtained from the trailer 30 with the first truck information stored in the server 10. That is, when the second truck information is identical to the first truck information, the truck 20 may determine that the second truck information is not damaged and may determine that the second truck information is valid.

The trailer 30 may verify validity of the second trailer information by comparing the second trailer information obtained from the truck 20 with the first trailer information stored in the server 10. That is, when the second trailer information is identical to the first trailer information, the trailer 30 may determine that the second trailer information is not damaged and may determine that the second trailer information is valid.

As such, the truck 20 and the trailer 30 may verify the integrity of the truck 20 and the trailer 30 by cross-validating the truck information and the trailer information. The server 10 may determine whether to start transportation based on the cross-validation between the truck information and the trailer information. Accordingly, the truck 20 and/or the trailer 30 may be prevented from being taken over and transportation accidents may be prevented.

Each of the trailer 30 and the truck 20 may transmit a connection completion signal to the server 10 based on success of the cross-validation. The server 10 having received the connection completion signal may transmit a driving test command to the truck 20. The truck 20 may start transportation to a destination after completing a driving test in response to the driving test command.

Also, the server 10 may monitor whether the truck 20 is hacked by comparing the truck state information periodically transmitted from the server 10 with the first truck information stored in the server 10. The server 10 may monitor whether the trailer 30 is hacked by comparing the trailer state information periodically transmitted from the trailer 30 with the first trailer information stored in the server 10. As such, the autonomous driving logistics system 1 may continuously monitor states of a truck and a trailer even during transportation, thereby preventing transportation accidents.

FIG. 3 is a flowchart for describing an autonomous driving logistics method, according to an embodiment.

Referring to FIG. 3, the server 10 may transmit a certificate to each of the truck 20, the trailer 30, and the loading and unloading system 40 (301). Next, when the autonomous driving logistics system 1 operates, if any one of the truck 20, the trailer 30, and the loading and unloading system 40 does not include a certificate or includes a different certificate, the operation of the autonomous driving logistics system 1 may be stopped.

The server 10 may transmit truck information to the trailer 30 and may transmit trailer information to the truck 20 (302). The truck 20 may move to the trailer 30 identified by the trailer information and may be connected to the trailer 30. The trailer information may be generated by the loading and unloading system 40 and may be stored in the server 10. The truck information refers to information about the truck 20 selected by the server 10. The server 10 may select the truck 20 to be connected to the trailer 30 on which the cargo 50 is loaded from a pre-stored truck list.

The truck 20 and the trailer 30 may cross-validate the truck information and the trailer information (303). Whether to start cargo transportation may be determined based on validity of the truck information and validity of the trailer information. The truck 20 may verify validity of second truck information by comparing the second truck information obtained from the trailer 30 with first truck information stored in the server 10. The trailer 30 may verify validity of second trailer information by comparing the second trailer information obtained from the truck 20 with first trailer information stored in the server 10.

While the truck 20 is driven according to the commencement of cargo transportation, the server 10 may obtain truck state information from the truck 20 and may obtain trailer state information from the trailer 30. The server 10 may monitor a transportation state based on the truck state information and the trailer state information (304). The server 10 may obtain the truck state information and the trailer state information at pre-determined intervals.

Figure 4:
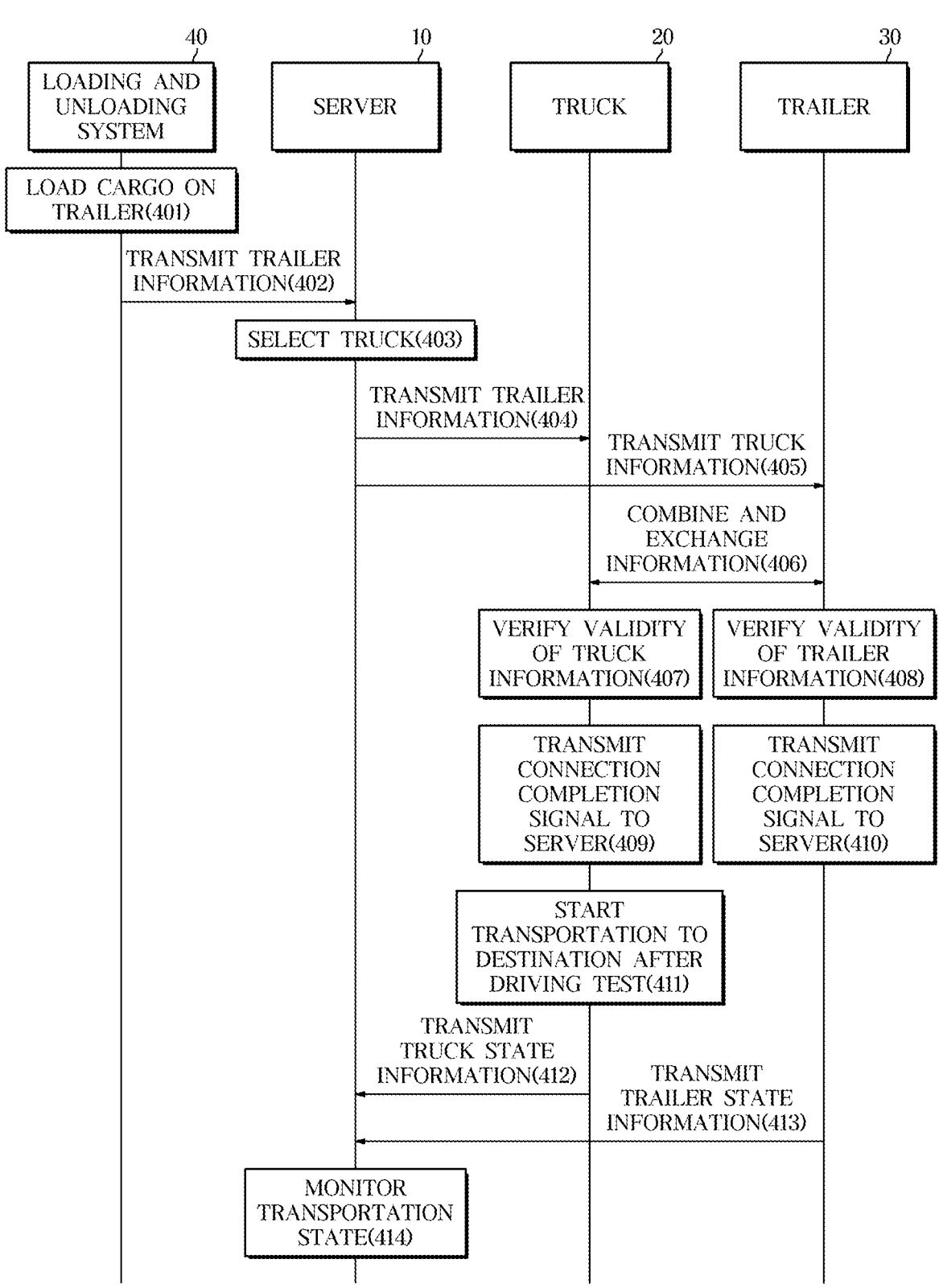
FIG. 4 is a flowchart for describing in detail an operation of an autonomous driving logistics system, according to an embodiment.
Figure 5:
FIG. 5 illustrates trailer information.

FIG. 4 is a flowchart for describing in detail an operation of an autonomous driving logistics system, according to an embodiment. FIG. 5 illustrates trailer information. FIG. 6 illustrates truck information and truck state information. FIG. 7 illustrates trailer state information.

In FIG. 4, each of the truck 20, the trailer 30, and the loading and unloading system 40 has received a certificate from the server 10.

First, the loading and unloading system 40 may load the cargo 50 on the trailer 30 (401). After the loading of the cargo 50 is completed, the loading and unloading system 40 may generate trailer information and may transmit the trailer information to the server 10 (402). The trailer information generated by the loading and unloading system 40 may be referred to as first trailer information. The loading and unloading system 40 may also transmit the first trailer information to the trailer 30.

Referring to FIG. 5, trailer information 500 may include a trailer identification number, a cargo identification number, cargo weight information, an origin identification number, and a destination identification number. For example, the trailer identification number may be 345219, the cargo identification number may be 23532, the cargo weight information may be 100 kg, the origin identification number may be 2341, and the destination identification number may be 2314.

The server 10 may select the truck 20 to be connected to the trailer 30 on which the cargo is loaded from a pre-stored truck list (403). The server 10 may transmit second trailer information, which is a duplicate of the first trailer information obtained from the loading and unloading system 40, to the selected truck 20 (404). That is, the second trailer information transmitted to the truck 20 may be identical to the first trailer information stored in the server 10.

Also, the server 10 may generate and store truck information about the selected truck 20. The truck information about the selected truck 20 may be referred to as first truck information. The server 10 may transmit second truck information, which is a duplicate of the first truck information, to the trailer 30 (405). That is, the second truck information transmitted to the trailer 30 may be identical to the first truck information stored in the server 10. Also, the server 10 may transmit the first truck information to the truck 20.

Referring to FIG. 6, truck information 610 may include a truck identification number, truck capacity information, failure information, battery information, and waiting state information. Also, the truck information 610 may further include a driving distance and a tire state. In the truck information of the selected truck 20, the truck identification number may be 1234, the truck capacity information may be 2000 kg, the driving distance may be 680 km, the failure information may be no failure, the tire state may be normal, the battery information may be full, and the waiting state information may be waiting.

The autonomous driving logistics system 1 may manage a plurality of trucks and a plurality of trailers. Information about the plurality of trucks may be stored in a truck list 600 and may be managed by the server 10. Information about the plurality of trailers may be stored in a trailer list 700 and may be managed by the server 10.

When the truck 20 and the trailer 30 are connected to each other, the truck 20 and the trailer 30 may exchange information with each other (406). The truck 20 may transmit the second trailer information to the trailer 30, and the trailer 30 may transmit the second truck information to the truck 20.

The truck 20 may verify validity of the second truck information by comparing the second truck information obtained from the trailer 30 with the first truck information stored in the server 10 (407). For example, the controller 23 of the truck 20 may identify whether the truck identification number (e.g., 1234) included in the first truck information of the server 10 is identical to the truck identification number (e.g., 1234) included in the second truck information of the trailer 30. When the second truck information is identical to the first truck information, the truck 20 may determine that the second truck information of the trailer 30 is not damaged or manipulated and may determine that the second truck information is valid.

The trailer 30 may verify validity of the second trailer information by comparing the second trailer information obtained from the truck 20 with the first trailer information stored in the server 10 (408). For example, the controller 34 of the trailer 30 may identify whether the trailer identification number (e.g., 345219) included in the first trailer information of the server 10 is identical to the trailer identification number (e.g., 345219) included in the second trailer information of the truck 20. When the second trailer information is identical to the first trailer information, the trailer 30 may determine that the second trailer information is not damaged or manipulated and may determine that the second trailer information is valid.

When the second truck information is valid, the truck 20 may transmit a connection completion signal to the server 10 (409). When the second trailer information is valid, the trailer 30 may transmit a connection completion signal to the server 10 (410).

The server 10 having received the connection completion signal may transmit a driving test command to the truck 20. The truck 20 may start transportation to a destination after completing a driving test in response to the driving test command. After the driving test is completed, the truck 20 may start transportation to the destination (411).

While the truck 20 transports the trailer 30 to the destination, the truck 20 may transmit truck state information to the server 10 (412), and the trailer 30 may transmit trailer state information to the server 10 (413).

Referring to FIG. 6, truck state information 620 may further include current location information in addition to the truck information 610. The truck list 600 may include the truck state information 620 of each of the plurality of trucks.

Referring to FIG. 7, trailer state information 710 may further include a truck identification number, truck connection state information, and current location information, in addition to the trailer information 500 of FIG. 5. The trailer list 700 may include the trailer state information 710 of each of the plurality of trailers.

The server 10 may monitor a transportation state based on the truck state information and the trailer state information (414). The server 10 may monitor whether the truck 20 is hacked by comparing the truck state information periodically transmitted from the truck 20 with the first truck information stored in the server 10.

For example, when the truck identification number of the truck state information received from the truck 20 is changed and thus is different from the truck identification information included in the first truck information of the server 10, the server 10 may determine that the truck 20 is hacked. Also, the server 10 may compare the current location information of the truck state information with previous location information of truck state information that is received in a previous cycle. When a current location of the truck 20 may not be predicted from a previous location or it is determined that the current location is manipulated, the server 10 may determine that the truck 20 is hacked.

The server 10 may monitor whether the trailer 30 is hacked by comparing the trailer state information 710 periodically transmitted from the trailer 30 with the first trailer information 500 stored in the server 10. For example, when the destination identification number of the trailer state information received from the trailer 30 is changed and thus is different from the destination identification information included in the first trailer information of the server 10, the server 10 may determine that the trailer 30 is hacked.

When at least one of the cargo identification number, the origin identification number, or the destination identification number of the trailer state information 710 is changed and thus is different from that of the first trailer information 500, the server 10 may determine that the trailer 30 is hacked.

Also, the server 10 may compare the current location information of the trailer state information 710 with previous location information of trailer state information that is received in a previous cycle. When a current location of the trailer 30 may not be predicted from a previous location or it is determined that the current location is manipulated, the server 10 may determine that the trailer 30 is hacked.

Also, when the truck connection state information of the trailer state information 710 is changed to a disconnected state before the truck 20 reaches the destination, the server 10 may determine that the truck 20 or the trailer 30 is hacked or taken over.

An autonomous driving logistics system and an autonomous driving logistics method according to embodiments of the disclosure may verify the integrity of a truck and a trailer in a process of transporting cargo without human intervention. Accordingly, the truck or the trailer may be prevented from being taken over, and transportation accidents may be prevented.

Also, the autonomous driving logistics system and the autonomous driving logistics method according to embodiments of the disclosure may continuously monitor states of the truck and the trailer even during transportation, thereby preventing transportation accidents.

Disclosed embodiments may be implemented on a recording medium storing instructions executable by a computer. The instructions may be stored as program code, and when being executed by a processor, may cause a program module to be generated and operations of the disclosed embodiments to be performed. The recording medium may be implemented as a computer-readable recording medium.

The computer-readable recording medium includes any type of recording medium in which instructions readable by a computer are stored. Examples of the recording medium may include a read-only memory (ROM), a random-access memory (RAM), a magnetic tape, a magnetic disk, a flash memory, and an optical data storage.

The disclosed embodiments have been described with reference to the attached drawings. It will be understood by one of ordinary skill in the art that the embodiments may be easily modified in other specific forms all without changing the technical spirit or the essential features of the disclosure. The disclosed embodiments are non-limiting examples of the disclosure, and should be considered in a descriptive sense only and not for purposes of limitation.

What is claimed is:

1. A driving logistics system comprising:
a truck comprising a first communicator, a first connection sensor, and a first controller comprising a first memory and a first processor;
a trailer connected to the truck, the trailer comprising a second communicator, a second connection sensor, and a second controller comprising a second memory and a second processor; and
a server configured to:
communicate with the trailer and the truck;

control the trailer and the truck to perform a cross-validation between truck information transmitted to the trailer and trailer information transmitted to the truck to determine whether to start a transportation; and
monitor a transportation state based on truck state information transmitted from the truck and trailer state information transmitted from the trailer,
wherein each of the first controller and the second controller is configured, through the first communicator and the second communicator, to transmit a connection completion signal to the server based on a success of the cross-validation,
wherein the server is further configured to transmit a driving test command to the truck in response to receiving the connection completion signal, and
wherein the first controller is configured to:
control the truck based on the driving test command to perform a driving test; and
control the truck to start the transportation to a destination after a completion of the driving test.

2. The driving logistics system of claim 1, further comprising a loading and unloading system configured to generate first trailer information based on loading of cargo on the trailer and to transmit the first trailer information to the server, wherein the server is configured to:
select the truck to be connected to the trailer from a truck list;
store first truck information about the selected truck;
transmit second truck information, which is a duplicate of the first truck information, to the trailer; and
transmit second trailer information, which is a duplicate of the first trailer information, to the truck.

3. The driving logistics system of claim 2,
wherein the trailer is configured to obtain the second trailer information stored in the truck when connected to the truck and to verify validity of the second trailer information by comparing the second trailer information with the first trailer information stored in the server, and
wherein the truck is configured to obtain the second truck information stored in the trailer when connected to the trailer and to verify validity of the second truck information by comparing the second truck information with the first truck information stored in the server.

4. The driving logistics system of claim 2, wherein the server is configured to:
monitor whether the truck is hacked by comparing the truck state information with the first truck information stored in the server; and
monitor whether the trailer is hacked by comparing the trailer state information with the first trailer information stored in the server.

5. The driving logistics system of claim 1, wherein the server is configured to control the trailer and the truck to further verify whether a first certificate transmitted to the truck and a second certificate transmitted to the trailer are identical to each other.

6. The driving logistics system of claim 1, wherein the truck and the trailer are configured to respectively transmit the truck state information and the trailer state information to the server at pre-determined intervals.

7. The driving logistics system of claim 1,
wherein the trailer information comprises a trailer identification number, a cargo identification number, cargo weight information, an origin identification number, or a destination identification number, and wherein the trailer state information comprises the trailer information and a truck identification number, truck connection state information, or current location information.

8. The driving logistics system of claim 1, wherein the truck information comprises a truck identification number, truck capacity information, failure information, battery information, or waiting state information, and wherein the truck state information comprises the truck information and current location information.

9. A method comprising:

transmitting, by a server, truck information to a trailer for connecting a truck and the trailer;

transmitting, by the server, trailer information to the truck for connecting the truck and the trailer;

controlling, by the server, the trailer and the truck to perform a cross-validation between the truck information transmitted to the trailer and the trailer information transmitted to the truck to determine whether to start a transportation; and monitoring, by the server, a transportation state based on truck state information received from the truck and trailer state information received from the trailer, wherein controlling the trailer and the truck comprises receiving from each a connection completion signal based on a success of the cross-validation, wherein controlling the truck comprises transmitting, by the server, a driving test command from the server to the truck in response to receiving the connection completion signal, wherein the truck is controlled by a first controller of the truck to perform a driving test based on the driving test command, and wherein the truck is controlled by the first controller to start the transportation to a destination after completing the driving test.

10. The method of claim 9, wherein transmitting the truck information comprises:

selecting the truck to be connected to the trailer from a truck list;

storing first truck information about the selected truck in the server; and transmitting second truck information, which is identical to the first truck information, to the trailer, and wherein transmitting the trailer information comprises:

when cargo is loaded on the trailer, transmitting first trailer information from a loading and unloading system to the server; and transmitting second trailer information, which is identical to the first trailer information, to the truck.

11. The method of claim 10, wherein controlling the trailer and the truck comprises:

controlling the trailer to obtain the second trailer information stored in the truck when the truck and the trailer are connected to each other and to verify validity of the second trailer information by comparing the second trailer information with the first trailer information stored in the server; and controlling the truck to obtain the second truck information stored in the trailer when the truck and the trailer are connected to each other and to verify validity of the second truck information by comparing the second truck information with the first truck information stored in the server.

12. The method of claim 10, wherein monitoring the transportation state comprises:

monitoring whether the truck is hacked by comparing the truck state information with the first truck information stored in the server; and monitoring whether the trailer is hacked by comparing the trailer state information with the first trailer information stored in the server.

13. The method of claim 9, wherein controlling the trailer and the truck comprises controlling the trailer and the truck to further verify whether a first certificate transmitted to the truck and a second certificate transmitted to the trailer are identical to each other.

14. The method of claim 9, wherein the truck state information and the trailer state information are transmitted to the server at pre-determined intervals.

15. The method of claim 9, wherein the trailer information comprises a trailer identification number, a cargo identification number, cargo weight information, an origin identification number, or a destination identification number, and wherein the trailer state information comprises the trailer information and a truck identification number, truck connection state information, or current location information.

16. The method of claim 9, wherein the truck information comprises a truck identification number, truck capacity information, failure information, battery information, or waiting state information, and wherein the truck state information comprises the truck information and current location information.

17. An apparatus comprising:

a server configured to:

communicate with a trailer and a truck connected to the trailer;

control the trailer and the truck to perform a cross-validation between truck information transmitted to the trailer and trailer information transmitted to the truck to determine whether to start a transportation;

monitor a transportation state based on truck state information received from the truck and trailer state information received from the trailer;

receiving connection completion signals from the truck and the trailer based on a success of the cross-validation; and transmit a driving test command to the truck in response to receiving the connection completion signal so that the truck performs a driving test based on the driving test command and so that the truck starts the transportation to a destination after a completion of the driving test.

18. The apparatus of claim 17, wherein the server is configured to control the trailer and the truck to further verify whether a first certificate transmitted to the truck and a second certificate transmitted to the trailer are identical to each other.

19. The apparatus of claim 17, wherein the server is configured to receive the truck state information and the trailer state information at pre-determined intervals.

20. The apparatus of claim 17, wherein the trailer information comprises a trailer identification number, a cargo identification number, cargo weight information, an origin identification number, or a destination identification number, wherein the trailer state information comprises the trailer information and a truck identification number, truck connection state information, or current location information, wherein the truck information comprises the truck identification number, truck capacity information, failure information, battery information, or waiting state information, and wherein the truck state information comprises the truck information and the current location information.

\* \* \* \* \*